Figure 1:
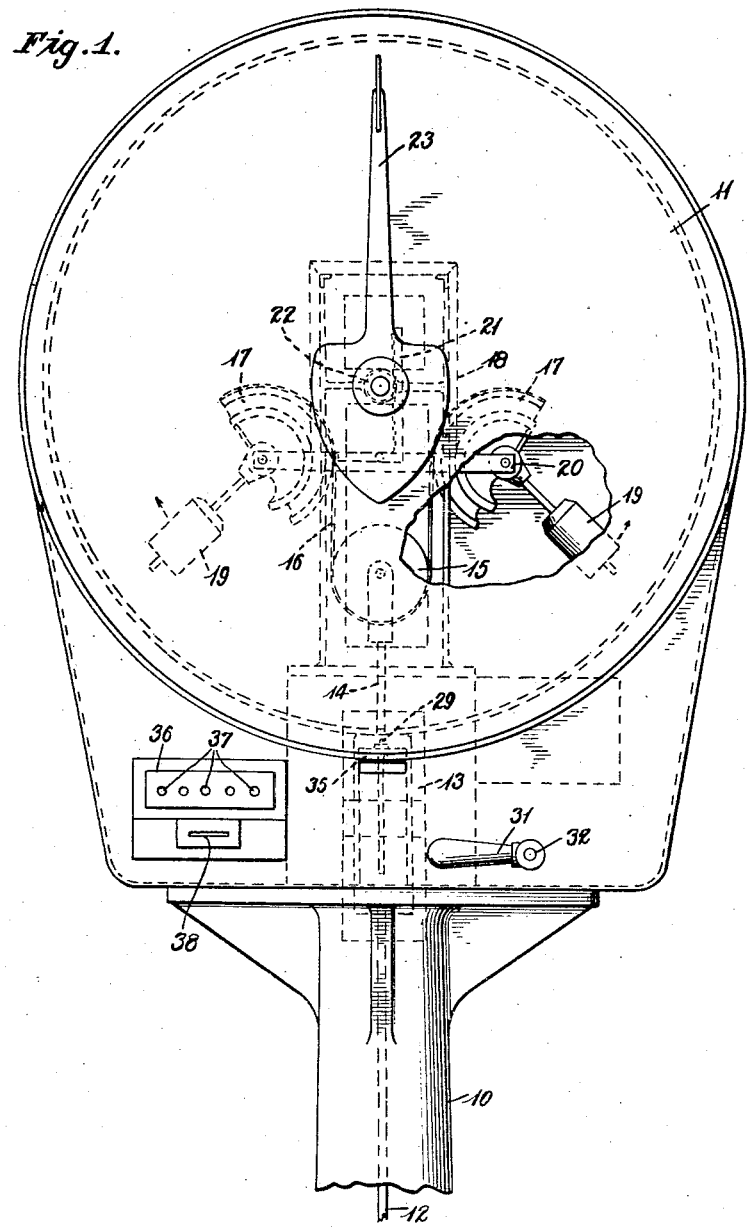

July 9, 1935.  O. VON BOHUSZEWICZ  2,007,317
WEIGHING MACHINE
Filed April 1, 1931  5 Sheets-Sheet 2

Inventor
Oscar von Bohuszewicz

By Knight Bros.
Attorneys

July 9, 1935.　　O. VON BOHUSZEWICZ　　2,007,317
WEIGHING MACHINE
Filed April 1, 1931　　5 Sheets-Sheet 3
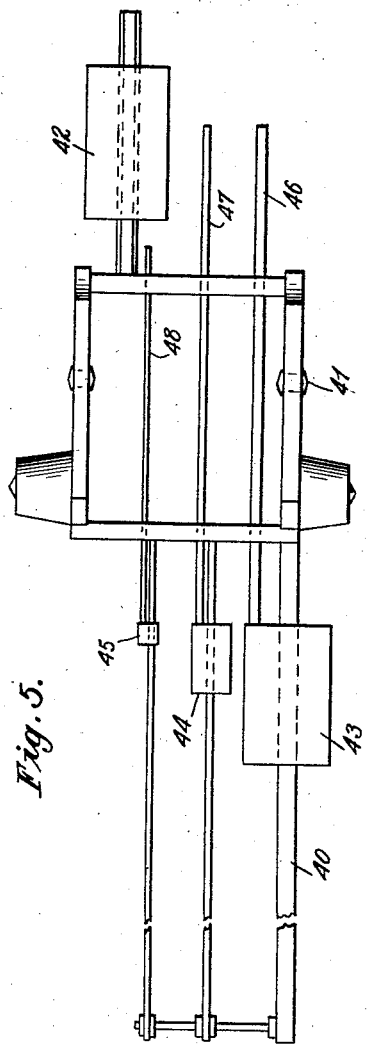
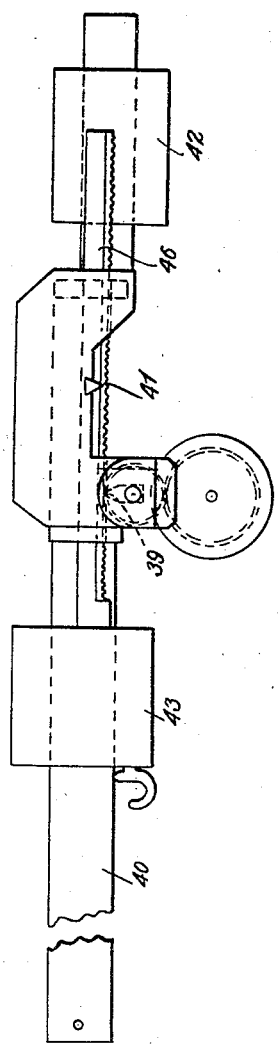
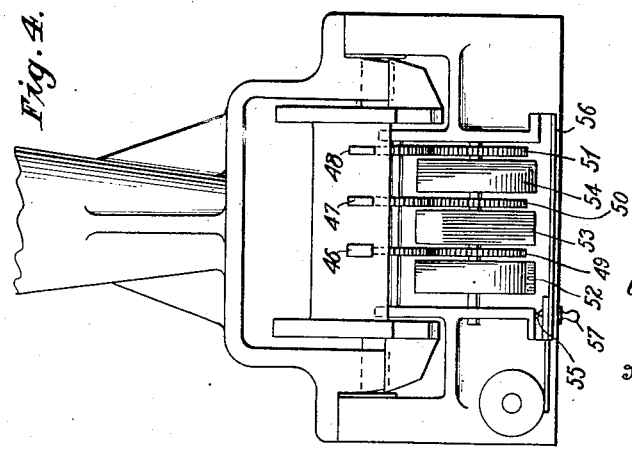
Inventor
Oscar von Bohuszewicz
By Knight Bros.
Attorneys July 9, 1935.  O. VON BOHUSZEWICZ  2,007,317
WEIGHING MACHINE
Filed April 1, 1931    5 Sheets-Sheet 4
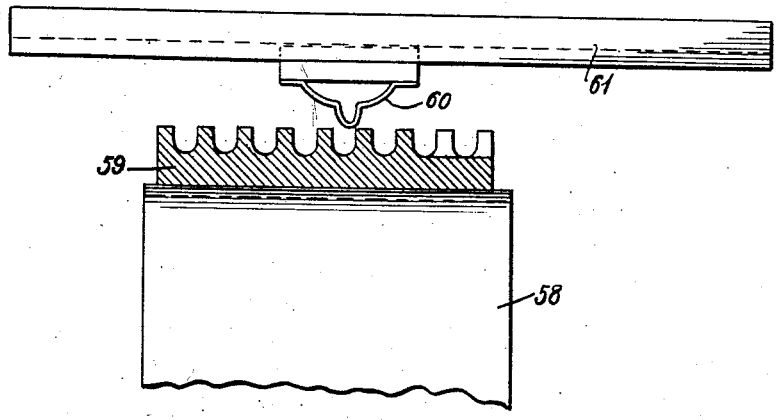
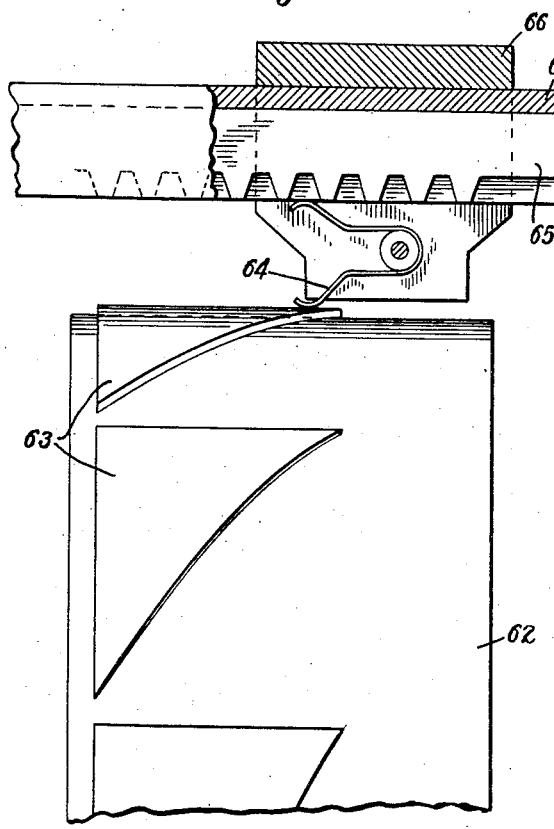
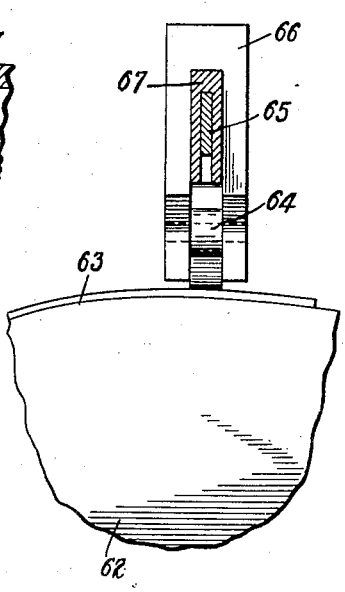
Inventor
Oscar von Bohuszewicz
By Knight Bros.
Attorneys July 9, 1935.   O. VON BOHUSZEWICZ   2,007,317
WEIGHING MACHINE
Filed April 1, 1931   5 Sheets-Sheet 5

Inventor
Oscar von Bohuszewicz
By Knight Bros.
Attorneys

Patented July 9, 1935

2,007,317

UNITED STATES PATENT OFFICE 2,007,317

WEIGHING MACHINE

Oscar von Bohuszewicz, Dusseldorf, Germany

Application April 1, 1931, Serial No. 526,930
In Germany April 3, 1930

20 Claims. (Cl. 177—351)

This invention relates to an indicating device for weighing machines, allowing the accurate automatic indication of the loads placed upon the weighing machine.

The invention has for its primary object the provision of a novel and improved contacting arrangement for a setting device which is moved in accordance with the loading applied to the weighing machine. This contrivance can consist, for instance, of one or several drums, discs or similar means, the contacts of which are brought in connection with a second contact device, when the equilibrium of the balance is obtained. This connection is effected by the movement of the second contact device, at which time several electrical impulses will be generated, and which in the instant application are used to operate a counter disc or equivalent means, which is magnetically controlled, as of the type common in telephony systems.

Another object of this invention is the provision of transparent openings at the drum, disc or similar means, instead of said contact pieces, these openings being illuminated by a source of light, as soon as the equilibrium of the balance is obtained. By the use of well known light-sensitive cells such as selenium cells in an electric circuit with a relay, several electrical impulses may be generated which may be used to control the counter disc or similar means in the manner mentioned above.

This appliance can be used for weighing machines of the steelyard type as well as for any kind of automatic weighing apparatus. In the first case, a special drum, or disc, or similar means can be provided for each column of figures, if the weighing is operated by several sliding poises, each of which corresponds to one particular column of figures. In case, however, that one single sliding poise is used for the weighing, this single sliding poise will move one single disc, drum or similar means, provided with the said contact pieces or openings.

If this appliance is used in connection with pendulum balance machines, the use of a single drum, disc or similar means, carrying the said contacts, or openings is desirable.

Figure 2:
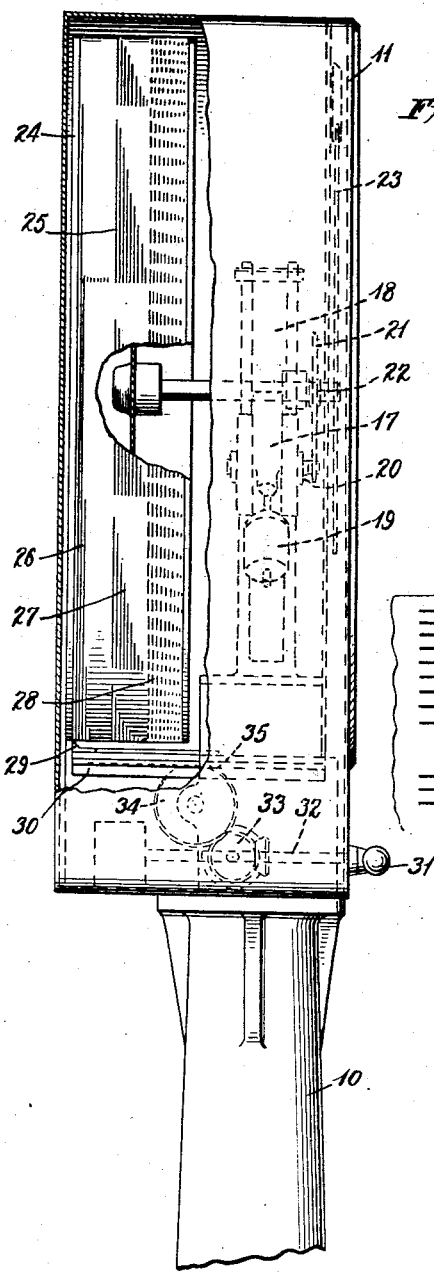

The accompanying drawings represent embodiments of this invention, wherein:

Figures 1 and 2 show the application of the invention in connection with a pendulum balance; thus, Fig. 1 is a front view of the appliance, while Fig. 2 is a left end view of Fig. 1, with certain parts broken away.

Figure 10:
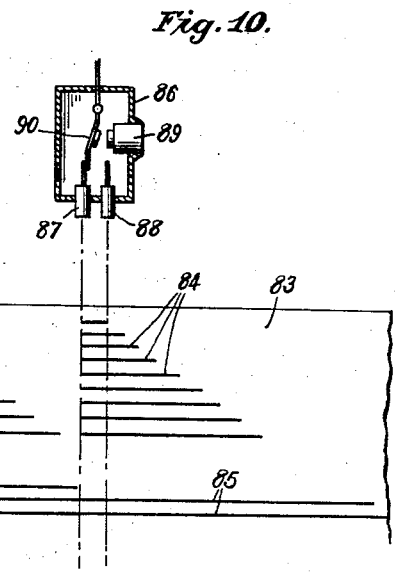
Figure 8:
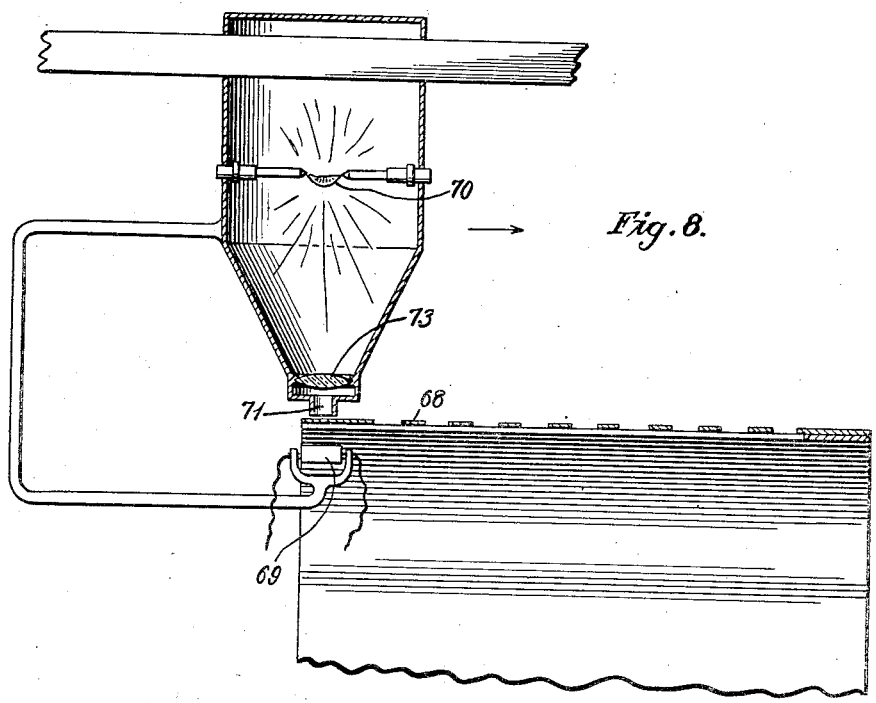
Figure 9:
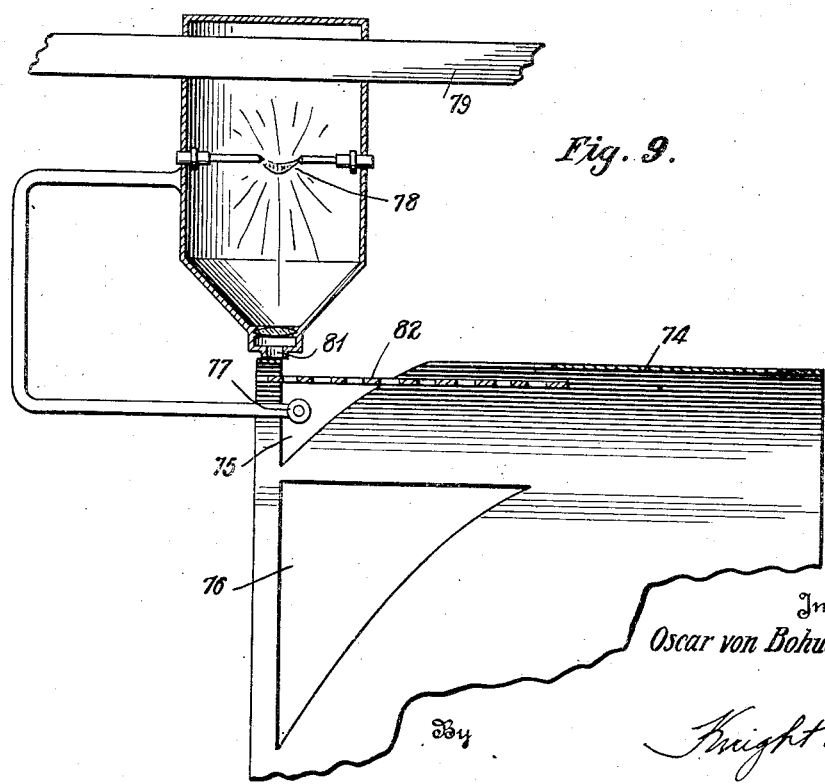

Fig. 3 represents a front elevation, with parts broken away of the arrangement in connection with a steelyard balance, Fig. 4 is an end view of this arrangement, while Fig. 5 is simply a plan view of a steelyard appliance, Fig. 6 is an enlarged view of the contacting means, for producing electric impulses, Fig. 7 is another arrangement of this kind, Fig. 7a is an end view of Fig. 7, Fig. 8 is an enlarged view of means for producing electric impulses, by using a selenium cell, while Fig. 9 is another arrangement, Fig. 10 is a view of the contacting device, incorporating a refinement for accurate operation.

In Fig. 1 is represented the standard 10 of the weighing device, which supports the head 11 containing the complete indicating device. The load applied acts upon the rod 12, and by means of the suspension gear 13, and the rod 14, it is transferred to a roller 15. A strap 16 which is secured by its upper end portions to one curve each of the two curved sectors 17, passes under the roller 15. The load acting on the roller 15 suspended in the strap 16 will move this strap down. The ends of a strap 18 are fastened to another curve of the curve sectors 17 in such a way as to allow the curved sectors 17 to rotate upon the downward movement of the strap 16. The heavier the load, the greater will be the actuating force exerted upon the rod 14, and the greater will be the swing imparted to the two inclined weights 19. The upward movement of the weights 19 will increase directly with the rotary movement imparted to the sectors 17.

These two curved sectors are connected to each other by a bridge 20, and move this bridge downward or upward. To the bridge 20 is attached a rack 21 which rotates the pinion 22. This will rotate the index 23 running around a reading scale or dial, rotating at the same time a setting means such as a drum, disc or similar means 24. The index 23 and the drum, disc or similar means 24, will consequently settle themselves in proportion with the load. Several parallel ranges of contact pieces 25 run around the outer surface of the drum being divided in circular zones 26, 27 and 28. Each one of these circular zones corresponds to a certain figure column. In the drawing are shown three zones, viz. 26, 27, and 28; one of them, e. g. 26 serves for adjusting the column for all the numbers in the "hundred-range", and the zone 27, for adjusting the "column of tens" and the zone 28 for adjusting the "figures below ten" or "units".

A contact brush 29 attached into a special sliding guide slips over the contacts and operates as a sensing means, in a direction parallel to the axis of the drum. Each zone of the contacts is connected, by a separate line, to one pole of a device generating the electric current. The contact brush 29 is connected to another pole of this generating device. As soon as the brush 29 slips over the contacts on the drum, electric impulses will arise in the said electric current circuit. Each electric impulse will displace the proper figure disc, by one number. If now the contact brush 29 is led along, in its guide, over the contacts on the drum, the circuit in each zone is closed and broken as many times as the contact brush 29 touches the contacts provided on the drum. Consequently, the counter disc of every zone will be operated up to the corresponding numeral.

If, for example, in the zone of the "hundred-column", three contact pieces will be touched by the contact brush 29, and in the "column of the tens" seven contacts are touched, and further in the "units" zone two contact pieces are touched, then the disc of the "hundred-column" will revolve up to the number "3", the disc of the "column of tens" revolves up to the number "7" and the disc of the "units" column up to the number "2", so that, at an appropriate spot the figure "372" will appear. The contact brush 29 can, for instance, be operated by a handle 31 thus rotating the shaft 32 which, by means of a bevel wheel 33 revolves a toothed wheel 34, the latter meshing with a rack 35 being rigidly attached to the contact brush 29. The counter discs are accommodated in a casing 36, the openings 37 of which will readily show the resulting figures. Besides, a well known printing mechanism can be provided in such a way, that the result of the weighing process is printed on a ticket, placed into the slot 38.

Figs. 3, 4, and 5 represent this arrangement in connection with a steelyard balance. In this case the load acts on a knife edge 41 at the steelyard beam 40. This steelyard beam has as its fulcrum point the knife edge 39, and is held in equilibrium by the counter-weight 42. Sliding poises 43, 44 and 45 run along the steelyard beam, each sliding poise being provided for one particular column of figures. (For the purpose of a clear understanding, the sliding poises 44 and 45 as well as their steelyard beams and the racks are left out in Fig. 3. The arrangement of these parts is clearly shown in Figs. 4 and 5.) Thus, for example, the sliding poise 43 can be used for setting the zone for the hundred-column, the sliding poise 44 for setting the zone for the column of the tens, and sliding poise 45 for the zone of the column below ten. Every one of these sliding poises is rigidly connected to a particular rack, designated by the elements 46, 47 and 48 meshing with the pinions 49, 50 and 51 by means of intermediate toothed wheels. The pinion 49 is rigidly connected to the drum 52,—the pinion 50 to the drum 53—and the pinion 51 to the drum 54. Each position of these drums corresponds therefore with a certain position of its proper sliding poise. After having applied the load on the balance, the sliding poises are set, either by hand, or by a well known electric setting device, in order to obtain the equilibrium of the balance. In accordance herewith, the drums 52, 53 and 54 settle themselves in the proper manner.

In the same way as specified for the contrivance illustrated in Figs. 1 and 2, the drums are brought in connection with a contact brush 55 by moving it in parallel direction with the axis of the drum. The contacts of the drum are connected to one pole of the circuit, and the contact brush 55 is connected to the other pole of the electric circuit; so that, in this case as well, contact between them will produce several electric impulses which, as specified above, will adjust the adequate counter discs, allowing the indication of the resulting weight in the manner as specified above. In this case also, the contact brush glides in a slide 56 in a direction parallel to the axis of the drum, and will be displaced by a handle 57 or means, as described above.

Instead of several sliding poises, one single sliding poise can be used, which in this case, is able also to displace several drums, by suitable systems of gearing as explained above, or which will act upon one drum, the latter being divided in several zones, in accordance with the different columns of figures, as specified with regard to the arrangement for pendulum balance machines.

In the case that the weighing result is recorded by means of an optical system, by using selenium cells, the drum, or drums, as the case may be, are provided with slots or other kinds of openings, instead of the said contact pieces. A source of light is then shifted in a direction parallel to the axis of the drum, as soon as the drum has settled itself in accordance with the correct load, in a manner similar to the movement of the contact brushes in a direction parallel to the axis of the drums in the case specified above. Through this shifting process, a selenium cell, located either outside or inside the drum barrel, oppositely to the light source, will be subjected to as many illumination impulses as openings or slots exist in the drum. These impulses of light, influencing the selenium cells, break and close that circuit which includes the selenium cell in question as many times as lighting impulses will arise. This results directly in electrical impulses which operate, to an oppropriate extent, the accessory counter discs in a manner as described.

Fig. 6 represents the contact device, in which 58 is the section through the drum, carrying the separate contacts 59 on which is brushed along the slightly springy contact brush 60, sliding on a slide device 61. By this slipping process, the contact brush 60 can for instance touch seven contacts at the spot designated in the sketch, thus producing seven electric impulses, which consequently will operate the counter disc, up to the number "7".

Fig. 7 represents a further embodiment for producing electrical impulses. In this case one section of the drum carries several contact pieces 63, having however no grooves, as in the previous design, but plane surfaces. The springy contact brush 64 is led along the surface of the drum, in a direction parallel to the drum axis. At the other side, this contact brush slips over a conducting toothed ledge 65 in such a way that the movement of element 64 gives rise to a circuit between 63 and 65, adapted to be interrupted by the breaks in the ledge 65. The number of these impulses produced is dependent upon the extent of the contact of 64 with the piece 63. As soon as the brush 64 fails to contact with piece 63, the contact brush 64 is in repeatedly temporary connection with the electric current supply through 65, however, no electric impulses can arise, the circuit being interrupted by the non-conducting part of the drum. The contact brush 64 glides along by the gliding shoe 66 on the slide 67 parallel to the axis of the drum. The electric impulses can as well be produced by any kind of contact devices, it is important however, that they will act for that length of time only, as the moving contact brush touches the contact piece located on the drum.

Fig. 8 represents the optical equipment for the production of electric impulses. 68 is the drum barrel, in this case provided with several light-permeable openings; 69 is the selenium cell which is in aligned relation with the source of light 70 so that it is always in front of the opening 71. The beam of light derived from the source 70 passes through a system of lenses 73 and the opening 71, and acts upon the selenium cell, if this is not prevented by the non-transparent part of the drum barrel 68. If the source of light, together with the selenium cell is led along the guide, parallel to the axis of the drum, then several impulses of light will hit the different slots in the drum barrel, by which the selenium cell will close the current circuit and produce an adequate number of electric impulses.

Fig. 9 shows how, instead of the multiple slots in the drum barrel, only a few larger transparent or light-permeable openings may be used, by locating a fixed interrupting device 82 with a few transparent openings between the source of light and the selenium cell. This mode of operation resembles that illustrated in Fig. 7 in conjunction with contacting devices. Transparent openings 75 and 76 are provided on the drum barrel 74. Inside the drum is located the selenium cell 77 which, together with the source of light 78 can be led along the guide 79, parallel to the axis of the drum. The beams of light pass through a system of lenses and appear through the opening 81. Before they hit the selenium cell, they have to pass the interrupting device 82. Through the movement of the source of light and the selenium cell, the latter will be hit by several impulses of light, but only in such a number as this will correspond to the breadth of the opening, the latter adjusting itself according to the load applied, and in conformity with the illuminated spot. The circuit in which the selenium cell is connected will thus experience a definite number of electrical impulses which operate the appropriate counter discs to proper numbers.

The supply of current for the source of light also can be interrupted by suitable contact devices, so that in this manner several impulses of light can act upon the selenium cell, but only during that time allowed by the breadth of the transparent openings on the drum, at the spot corresponding with the weighing result.

Instead of the drum explained above, discs or similar means can be used in every case, which, however, would carry laterally the said contact pieces or transparent openings. In this case, the necessary device for the production of electric impulses, or the source of light, influencing the selenium cell, would be moved in a direction perpendicular to the axis of the disc.

In the contact controlling process or in the lighting process it is easily possible to obtain wrong results if the drum is in a somewhat slanting position, or other forms of slight misadjustment exist. If, for instance, the drum will be in such a position that in one zone the contact spot, corresponding to the number 9, will be hit by the contact brush, and if the appertaining number in the other zone will be 2 it will be possible that instead of the number 29, the wrong number 39 will appear, by hitting the neighboring third contact spot.

In a similar way the fault could occur in the lighting process, with the sole difference that instead of hitting wrong contact pieces, wrong openings of the drum will be illuminated.

According to the invention, a switch device could be provided in the form of a relay, which receives electric current at the moment, when contacting occurs at spots which are likely to render a wrong indication, for instance, at all spots provoking the indication of the number 9. By this relay, either the contact brush is displaced to one side, thus guaranteeing that, by brushing along, the correct contact pieces only will be hit, or the current of the brush will be interrupted by the action of the relay, and a second auxiliary brush, running laterally along the main brush, will be fed with electric current, and will thus perform the further contacting.

This invention can be applied for all the devices described above, such as steelyard balances, pendulum balances or other contrivances, thus either with contacting devices, or illuminating devices.

Fig. 10 shows an embodiment of the refinement. On the portion 83 of the drum barrel are situated several contact pieces 84 and 85. On a guide, not shown in this drawing, the contact device 86 and at the same time the contact brush 87 as well as the auxiliary contact brush 88 are guided along over the contact pieces on the drum, in the direction of the dotted line. If the drum is in such a position as that illustrated in Fig. 10, the movement of contact brush 87 will cause nine contacting impulses to occur in one zone. Magnet 89 will become energized responsive to such nine consecutive impulses and only to such. The magnet will attract the piece 90, thus feeding electric current to the brush 88, which, thereby, continues the contacting process in a position offset from the main brush wherein there is no likelihood that it contact with the three conductors rather than the two.

In all the cases of the invention as specified above, the closing of the current circuit may be obtained also indirectly. Thus, the contact pieces on the drum need not be in connection with the source of the electrical energy, but the movement of the contact brush is produced in such a manner that another contact piece is touched by the contact brush, thus closing the current circuit.

This invention can be used as well, in an appropriate way, for other kinds of weighing devices, for the indication of the load in which counter discs are controlled by electrical impulses, in accordance with the load applied.

Having now fully explained my invention, I declare that my claims are the following:

1. In combination with a weighing machine, a registering device for said machine having a capacity of a plurality of orders, an electrical impulse controller for said registering device comprising two relatively movable members, light permeable openings on one of said members, said openings being divided into a plurality of zones corresponding to the orders of said registering device, a light source and light-sensitive cell on the other one of said members on opposite sides of said openings, an electrical circuit embodying said cell, and means for relatively moving said members for generating a plurality of electrical impulses in each of said zones for controlling the respective orders of said registering device.

2. In combination with a weighing machine, a registering device for said machine having a capacity of a plurality of orders, an electrical impulse controller for said registering device comprising setting means positioned in accordance with the load applied to said machine, said setting means being divided into a plurality of zones corresponding to the orders of said registering device, light-permeable openings in said setting means, a light source and light-sensitive cell on opposite sides of said setting means, an electric circuit embodying said cell, and means for moving said light source and cell past said openings for generating a plurality of electrical impulses in each of said zones for controlling the corresponding orders of said registering device.

3. In combination with a weighing machine, a registering device for said machine having a capacity of a plurality of orders, an electrical impulse controller for said registering device comprising setting means positioned in accordance with the load applied to said machine, said setting means being divided into a plurality of zones corresponding to the orders of said registering device, light-permeable openings in said setting means, a light source and light-sensitive cell on opposite sides of said setting means, an electric circuit embodying said cell, and means for relatively moving said light source and cell and said setting means for generating a plurality of electrical impulses in each of said zones for controlling the corresponding orders of said registering device.

4. In combination with a weighing machine, a registering device for said machine having a capacity of a plurality of orders, an electrical impulse controller for said registering device comprising a drum positioned in accordance with the load applied to said machine, said drum being divided into a plurality of zones in its axial direction, said zones corresponding to the orders of said registering device, a series of light-permeable openings disposed upon the periphery of said drum in said zones, a light source and light-sensitive cell on opposite sides of said peripheral surface of said drum, an electrical circuit embodying said cell, means for relatively moving said light source and cell and said drum for generating a plurality of electrical impulses in each of said zones for controlling the corresponding orders of said registering device.

5. In combination with a weighing machine, a registering device for said machine having a capacity of a plurality of orders, each of said orders having a series of regular increments, an electrical impulse controller for said registering device comprising two relatively movable members, a light-permeable opening on one of said members corresponding to one of the orders of said registering device having a varying dimension along different elements thereof, a light source and light-sensitive cell on the other one of said members on opposite sides of said opening, an electrical circuit embodying said cell, means for relatively moving said members along one of the elements of said opening, and means for converting the relative movement along said one element of said opening into a series of electrical impulses corresponding to the dimension of said element to control said one order of said registering device.

6. In combination with a weighing machine, a registering device for said machine having a capacity of a plurality of orders, each of said orders having a series of regular increments, an electrical impulse controller for said registering device comprising a setting member positioned in accordance with the load applied to said machine, a light-permeable opening in said setting member for controlling one of the orders of said registering device, said opening having a varying width, a light source and light-sensitive cell on opposite sides of said opening, means for relatively moving said light source and cell and said setting member across the width of said opening, and means for converting the movement across the opening into a series of electrical impulses varying in number in accordance with the width of the opening at the line of relative movement, for controlling one of the orders of said registering device.

7. In a device for registering numerical values, two relatively movable members, at least one light-permeable opening on one of said members having a varying dimension along different elements thereof wherein each of said elements corresponds to a numerical value, a light source and light-sensitive cells on the other one of said members on opposite sides of said opening, an electrical circuit embodying said cell, means for relatively moving said members along one of the elements of said opening, and means for converting the relative movement along said one element of said opening into a series of electrical impulses of a numerical value corresponding to the dimension of said element.

8. The combination claimed in claim 7 wherein said last-mentioned means comprises a light-intercepting member having a plurality of light-permeable openings therein at least as great as the maximum number of electrical impulses to be converted by the relative movement between the members.

9. In a device for registering numerical values, a register having a capacity of a plurality of orders, an electrical impulse controller for said register comprising two relatively movable members, light-permeable openings on one of said members, said openings being divided into a plurality of zones corresponding to the orders of said register, a light source and light-sensitive cell on the other one of said members on opposite sides of said openings, an electrical circuit embodying said cell, and means for relatively moving said members for generating a plurality of electrical impulses in each of said zones for controlling the respective orders of said register.

10. In combination with a weighing machine, a register for said machine having a capacity of a plurality of orders, each of said orders having a series of regular increments, an electrical impulse controller for said register comprising setting means positioned in accordance with the load applied to said machine, said setting means being divided into a plurality of zones corresponding to the orders of said register, and means for producing electrical impulses for the range of said series of increments associated with said zones for controlling the corresponding orders of said register comprising a main impulse-provoking sensing means, a normally inoperative auxiliary sensing means offset from said main sensing means, and means responsive to a predetermined number of impulses provoked by said main sensing means during its passage through one of said zones to render the main sensing means inoperative and the auxiliary sensing means operative during the passage of said sensing means through the immediately adjacent higher zone.

11. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means comprising an electrical contact device for relatively shifting said sensing means and first member at critical transition points between said elements, whereby erroneous registrations are excluded.

12. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means comprising an electrical contact device for jumping said sensing means relative to said first member at critical transition points between said elements, whereby erroneous registrations are excluded.

13. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means for relatively shifting said sensing means and first member at critical transition points between said elements comprising an electromagnetic relay responsive to a predetermined number of impulses, whereby erroneous registrations are excluded.

14. In combination with a weighing machine, a registering device for said machine having a capacity of a plurality of orders, each of said orders having a series of regular increments, an electrical impulse controller for said registering device comprising two relatively movable members, a series of elements on one of said members divided into a plurality of zones corresponding to the orders of said registering device and corresponding to the series of regular increments in each of said orders, and means for producing electrical impulses for the range of said series of increments associated with said zones for controlling the corresponding orders of said registering device comprising a main impulse-provoking sensing means, a normally inoperative auxiliary sensing means offset from said main sensing means, and means responsive to a predetermined number of impulses provoked by said main sensing means during the scanning of one of said zones to render the main sensing means inoperative and the auxiliary sensing means operative during the scanning of the immediately adjacent higher zone by said sensing means.

15. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means for relatively shifting said sensing means and first member at critical transition points between said elements comprising a main impulse-provoking contacting device, a normally inoperative auxiliary impulse-provoking contacting device offset from said main contacting device, and means for rendering said last-mentioned device inoperative and said auxiliary contacting device operative at critical transition points between said elements, whereby erroneous registrations are excluded.

16. In a device for registering numerical values, two relatively movable members, a series of elements on one of said members corresponding to the increments of the numerical values, a registering device, the other one of said members constituting a sensing means for gauging the elements on said first member and correspondingly controlling said registering device, and means for relatively shifting said sensing means and first member at critical transition points between said elements comprising a main impulse-provoking contacting device, a normally inoperative auxiliary impulse-provoking contacting device offset from said main contacting device, and an electromagnetic relay responsive to a predetermined number of impulses provoked by said main contacting device.

17. In a device for registering numerical values, two relatively movable members, a series of elements on one of said members corresponding to the increments of the numerical values, a registering device, the other one of said members constituting a sensing means for gauging the elements on said first member and correspondingly controlling said registering device comprising a main sensing element and an auxiliary sensing element displaced from said main sensing element, and means for rendering said main sensing element inoperative and said auxiliary sensing element operative at critical transition points between said elements on said first member whereby erroneous registrations are excluded.

18. In a weighing machine, a setting member adapted to be positioned in accordance with the weight applied to the machine, a series of elements on said member corresponding to the increments of the weights adapted to be measured by the machine, said elements having critical transition points, a registering mechanism, a main contactor for gauging said elements and correspondingly controlling said registering mechanism, an auxiliary contactor offset from said main contactor, and means for rendering said main contactor inoperative and said auxiliary contactor operative at critical transition points between said elements, whereby erroneous records are excluded.

19. In combination with a weighing machine, an indicator for said machine having a capacity of a plurality of orders, each of said orders having a series of regular increments, an electrical impulse controller for said indicator comprising a drum positioned in accordance with a load applied to said machine, a transparent opening disposed upon the periphery of said drum for controlling one of the orders of said indicator, said opening having an increasing width in the axial direction of the drum through said series of increments positioned circumferentially, a source of light and a light responsive cell oppositely disposed with reference to said peripheral surface, means for moving said light source and cell in said axial direction, and means for intermittently interrupting the light ray striking the cell during the extent of its movement across the width of said transparent opening whereby a plurality of electrical impulses are generated and a numeral corresponding to the number of electrical impulses is set in said one order of said indicator.

20. The combination claimed in claim 19 wherein said last-mentioned means comprises a light intercepting member having a series of apertures therein fixedly mounted between said light source and said light responsive cell.

OSCAR von BOHUSZEWICZ.